(12) United States Patent
Weast

(10) Patent No.: US 7,454,511 B2
(45) Date of Patent: *Nov. 18, 2008

(54) VISIBILITY OF UPNP MEDIA RENDERERS AND INITIATING RENDERING VIA FILE SYSTEM USER INTERFACE

(75) Inventor: John C. Weast, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 890 days.

This patent is subject to a terminal disclaimer.

(21) Appl. No.: 10/447,882

(22) Filed: May 29, 2003

(65) Prior Publication Data

US 2004/0243694 A1 Dec. 2, 2004

(51) Int. Cl.
*G06F 15/16* (2006.01)
(52) U.S. Cl. .................. 709/231; 709/223; 709/219; 709/203
(58) Field of Classification Search .......... 709/203, 709/223, 231, 219
See application file for complete search history.

(56) References Cited

U.S. PATENT DOCUMENTS

| | | | |
|---|---|---|---|
| 5,913,038 A * | 6/1999 | Griffiths | 709/231 |
| 6,675,387 B1 * | 1/2004 | Boucher et al. | 725/105 |
| 2004/0044723 A1 * | 3/2004 | Bell et al. | 709/203 |
| 2004/0148362 A1 * | 7/2004 | Friedman | 709/217 |

OTHER PUBLICATIONS

MediaRenderer:1 Device Template Version 1.01 For Universal Plug and Play Version 1.0, Jun. 25, 2002, 12 pgs, Microsoft Corporation.
MediaServer:1 Device Template Version 1.01 For Universal Plug and Play Version 1.0, Jun. 25, 2002, 12 pgs, Microsoft Corporation.
UPnP AV Architecture:0.83 For Universal Plug and Play Version 1.0, Jun. 12, 2002, Microsoft Corporation.

* cited by examiner

*Primary Examiner*—William C Vaughn, Jr.
*Assistant Examiner*—Joiya M. Cloud
(74) *Attorney, Agent, or Firm*—Schwabe, Williamson & Wyatt, P.C.

(57) ABSTRACT

A computing device is equipped with file system services and media related services that automatically make visible to a user of the computing device, through an user interface of the file system, availability of one or more UPNP media renderers, on discovery of the availability of the one or more UPNP media renderers. In various embodiments, the file system services and the media related services are further equipped to cause a media content to be rendered by a UPNP media renderer, in response to the user dragging and dropping the file system entry corresponding to the media content into the file system entry corresponding to the UPNP media renderer.

11 Claims, 15 Drawing Sheets

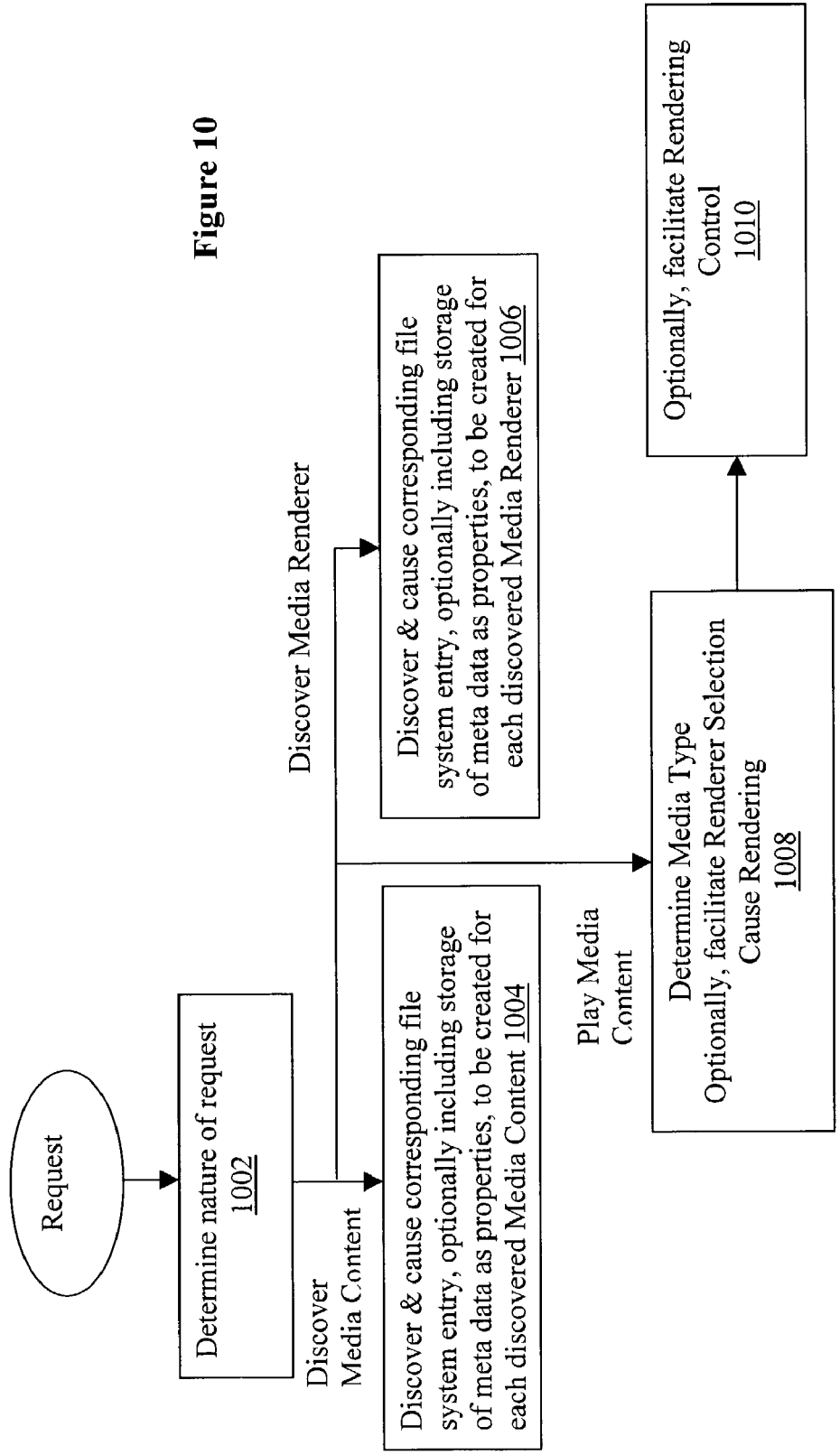

VISIBILITY OF UPNP MEDIA RENDERERS AND INITIATING RENDERING VIA FILE SYSTEM USER INTERFACE

FIELD OF THE INVENTION

The present invention relates to the field of media content rendering. More specifically, the present invention is related to a user friendly technique to employ UPnP media renderers to render media content available from UPnP media servers.

BACKGROUND OF THE INVENTION

Advances in microprocessor and related technologies have led to wide spread deployment and adoption of computing devices. Computing powers that used to be available only in very expensive main frame computers requiring conditioned operating environment, are now available in many personal computing devices. Their form factors vary from desktop, laptop, palm sized, and so forth. A number of these computing devices are packaged as "special purpose" devices, such set-top boxes, entertainment control centers, personal digital assistants (PDA), pagers, text messengers, and wireless mobile phones.

Concurrently, advances in networking, telecommunication and related technologies, in particular, in the area of wireless networking/communication, have led to increased connectivity between computing devices, over local, private, wide area, and/or public networks. Of particular notoriety is the Internet.

Together, these and other related factors have contributed to the availability of rich multi-media content available from a variety of media servers, for consumption on a variety of media rendering devices. Recently, this trend of connected consumption of high quality media content has made particular significant advances in the home operating environment.

To facilitate interchangeability and ease of employment of a wide range of rich media rendering devices to render media contents, the UPnP A/V Architecture Specification and a number of related specifications are being developed by the members of the UPnP Forum. These specifications specify the protocol and services to be supported by the UPnP A/V Media Server providing media contents, and the UPnP A/V Media Renderers which render the provided media contents, and the control point which controls the cooperation between the complying media servers and the complying media renderers.

However, these specifications do not specify the user interface through which the media contents, the complying servers and renderers are to be made visible to the users at the control points, and the user interface through which their operations are to be controlled.

Thus, an approach, preferably a user friendly one, for a user at a UPnP control point to discern the media contents available from the various UPnP media severs, and the various UPnP media renderers present in a network domain, and to control their operations to consume the available media content is desired.

BRIEF DESCRIPTION OF THE DRAWINGS

The present invention will be described by way of exemplary embodiments, but not limitations, illustrated in the accompanying drawings in which like references denote similar elements, and in which:

FIG. 10 illustrates the operational flow of the relevant aspects of the media related services of the control point device of FIG. 1, in accordance with one embodiment.

DETAILED DESCRIPTION OF EMBODIMENTS OF THE INVENTION

The present invention includes a user friendly technique for a user to employ and control a UPnP media renderer to render media content available from a UPnP media server in an operating environment.

Parts of the description will be presented in terms commonly employed by those skilled in the art to convey the substance of their work to others skilled in the art. The terms "control point", "media content", "media server" and "media renderer" have the same meaning as the terms are employed in the UPNP A/V Architecture and related specifications, available at the time of filing the present application. In the case of UPnP A/V Architecture Specification, that is version 1.0.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
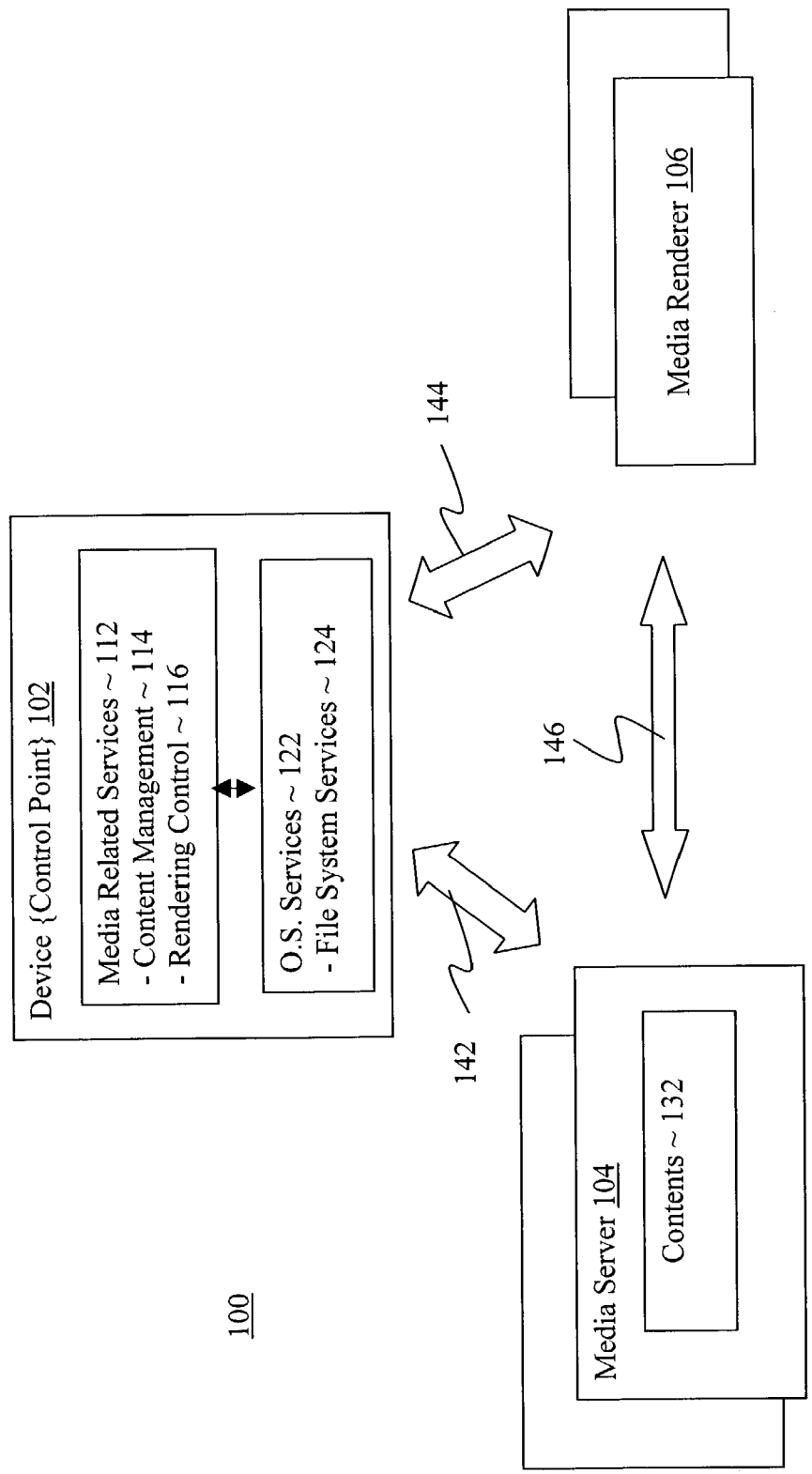
FIG. 1 illustrates a system view of an example operating environment suitable for use to practice the present invention, in accordance with one embodiment.

Referring now to FIG. 1, wherein an overview of an example operating environment incorporated with the teachings the present invention, in accordance with one embodiment, is shown. As illustrated, example operating environment 100 includes device 102, operating in the role of a UPnP control point, UPnP media servers 104, and UPnP media renderers 106, operationally coupled to each other as shown.

UPnP media servers 104 comprise a number of media contents 132. UPnP media servers 104 provide media contents 132 to selected ones of UPnP media renderers 106 to render, at the control of control point 102. In various embodiments, media contents 132 provided by UPnP media servers 104 may include media contents 132 accessible to UPnP media servers 104, but not disposed on UPnP media servers 104 itself.

Media contents 132 may be audio, video, textual, graphical, pictorial, and/or other contents of the like, including combinations thereof. Each UPNP media renderer 106 may be equipped to render one or more of the enumerated media types, i.e. audio, video, and so forth.

In general, the term "media content" as used herein is synonymous with the term "media item" used in the earlier identified UPnP Specification, unless the context clearly indicates to the contrary.

In various embodiments, elements 102-106 are coupled to each other wirelessly 142-146, i.e. they are members of a wireless network domain. In other embodiments, elements 102-106 are coupled to each other as members of a wire based network domain.

Regardless of the manner elements 102-106 are coupled to each other, for the embodiment, elements 102-106 are equipped to operate in accordance with the above described UPnP family of specifications.

Additionally, in accordance with the present invention, control point device 102 includes media related services 112 and enhanced file system services 124, part of operating system services 122. Media related services 112 and enhanced file system services 124 are equipped to cooperate with each other, to enable media contents 132 available from UPnP media servers 104 and availability of UPnP media renderers 106 be made visible through the user interface of the file system implemented by file system services 124.

Further, selection of media content 132 for rendering, and media renderer 106 to perform the rendering, may be made through the same user interface of the file system.

Preferably, the file system user interface is a graphical user interface. An example of a graphical file system user interface is the file system user interface of the Windows family of operating systems of Microsoft Corporation, of Redmond, Wash.

Resultantly, since users are generally familiar with the user interfaces of the file systems of the devices the UPnP control points reside, consumption of media contents 132, using UPnP media renderers 106, and controlling the rendering may be made much more user friendly than the prior art. Further, as will be apparent from the descriptions to follow, legacy media contents may be easily made available and rendered by the available UPnP renderers also.

Continuing to refer to FIG. 1, for the embodiment, media related services 112 include in particular, media content management service 114 and media rendering control service 116. Media content management service 114 is equipped to facilitate making visible the availability of media contents 132 from UPnP media servers 104. Media rendering control service 116, on the other hand, is equipped to facilitate making visible the availability of UPnP media renderers 106 through the user interface of the file system, as well as selection of media contents 132 for rendering by selected ones of UPnP media renderers 106. [Accordingly, media rendering control service 116 as referred herein is to be distinguished from the service bearing the same name specified in the earlier mentioned UPnP Specification, unless the context clearly indicates to the contrary.]

Except for media related services 112, and enhancements made to file system services 124, device 102 (including operating system services 122, other than the enhancements made to file system services 124), UPnP media servers 104 (including media contents 132) and UPnP media renderers 106 represent a broad range of these elements known in the art, and to be designed. The functions as well as their constitutions are known; accordingly, they will not be further described.

Media related services 112 and enhancements made to file system services 124 will be further described in turn below. However, before doing so, it should be noted that while for ease of understanding, control point device 102 and UPnP media servers 104 are illustrated, and will be described as separate entities, in alternate embodiments, control point device 102 and at least some of the UPnP servers 104 may be implemented on the same apparatus.

In one embodiment, operating environment 100 is a home computing environment.

Figure 2:
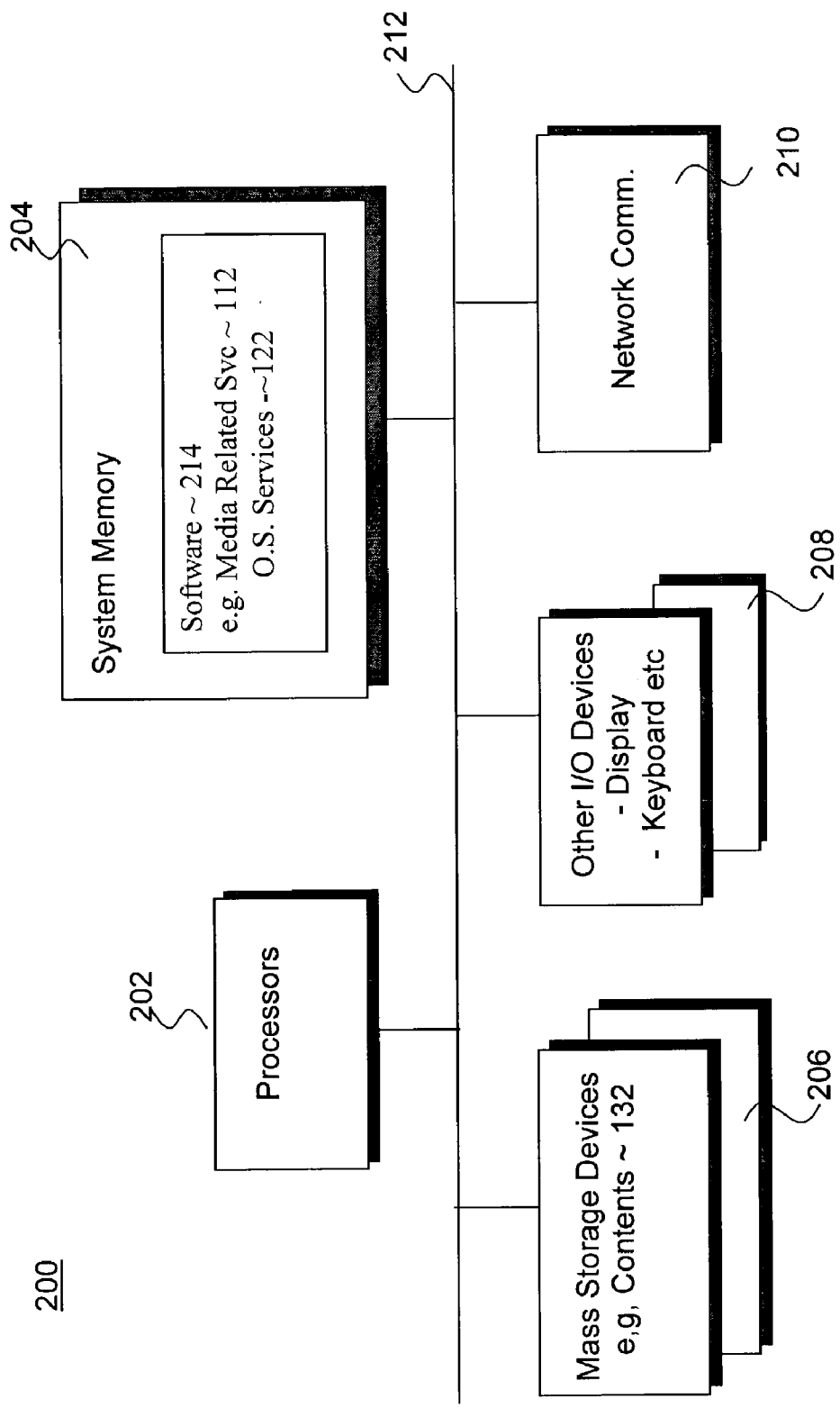
FIG. 2 illustrates an architectural view of a device suitable for use as a UPnP control point and/or a UPnP media server, in accordance with one embodiment.

FIG. 2 illustrates an example computing device 200, suitable for use to as either control point device 102 or UPnP media server 104 to practice the present invention, in accordance with one embodiment. As illustrated, computing device 200 includes one or more processors 202, system memory 204, mass storage devices 206, other I/O devices 208 and network communication interface 210, coupled to each other via system bus 212 as shown.

Processor 202 is employed to execute various software components 214, e.g. media related services 112 and operating system services 122 when computing device 200 is used as control point device 102. Processor 202 may be any one of a number of processors known in the art or to be designed. Examples of suitable processors include but are not limited microprocessors available from Intel Corp of Santa Clara, Calif.

System memory 204 is employed to store working copies of software components 214, such as media related services 112 and operating system services 122 in the case of control point device 102. System memory 204 may be Dynamic Random Access Memory (DRAM), Synchronous DRAM (SDRAM) or other memory devices of the like.

Mass storage devices 206 are employed to persistently store data, including e.g. contents 132, if computing device 200 is used as a UPnP media server 104. Examples of mass storage devices 206 include but are not limited to hard disks, CDROM, DVDROM, and so forth.

Other I/O devices 208 are employed to facilitate other aspects of input/output. Examples of other I/O devices 208 include but are not limited to keypads, cursor control, video display and so forth.

Network communication interface 210 is employed to facilitate network communication with control point device 102 or UPnP media server 104, depending on whether computing device is used as UPnP media server 104 or control point device 102, as well as communication with UPnP media renderers 106. Network communication interface 210 may be wired based or wireless. In various embodiments, network communication interface 210 may also support other networking protocols.

In various embodiments, computing device 200, whether used as control point device 102 or UPnP media server 104, may be a desktop computer, a laptop computer, a tablet computer, a palm-sized computing device, a PDA, a set-top box, an entertainment center controller, a wireless mobile phone, and so forth.

Figure 3A:
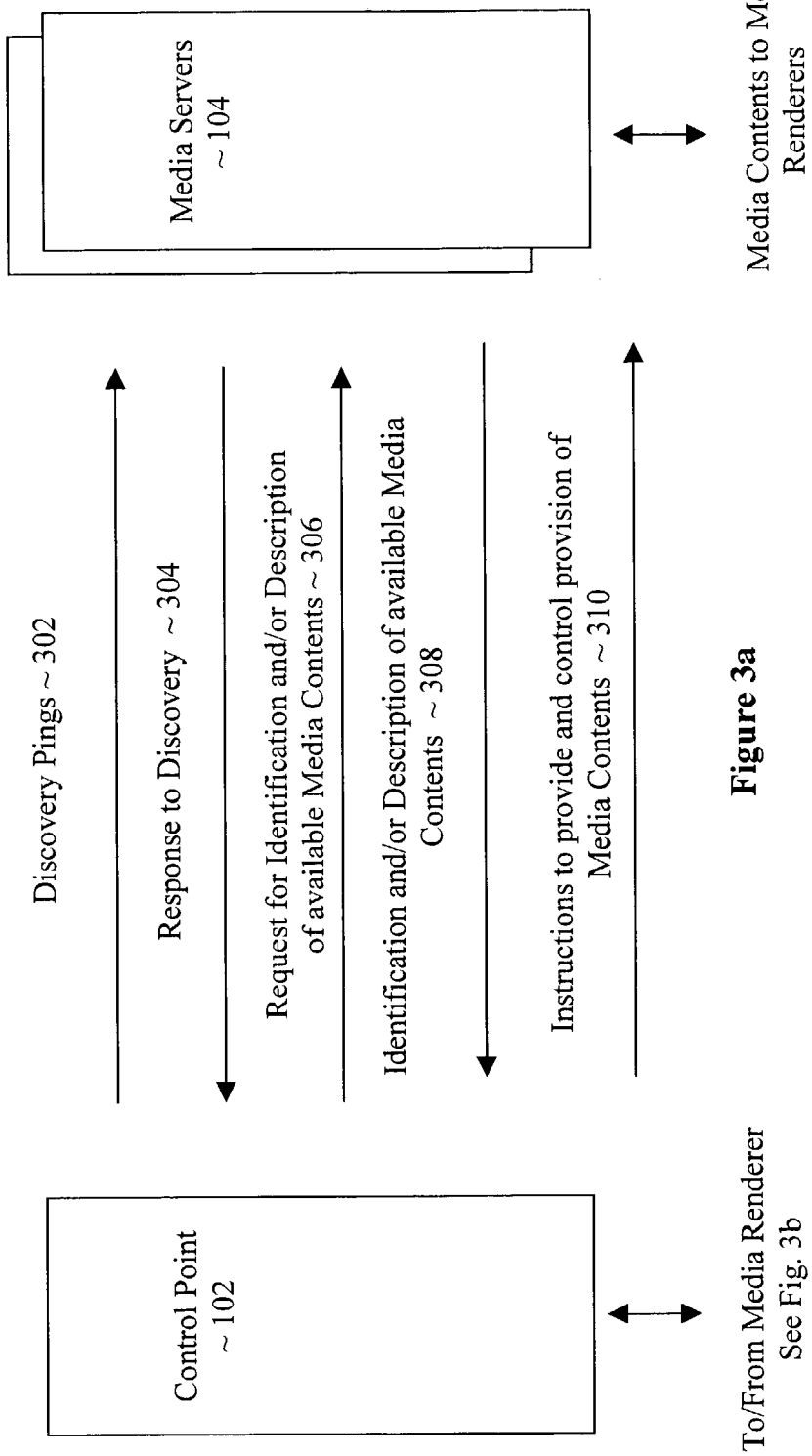
FIGS. 3a-3b illustrate an overview of the protocol and methods for the UPnP control point to interact with and control the UPnP media servers and the UPnP media renders, in accordance with one embodiment.
Figure 3B:
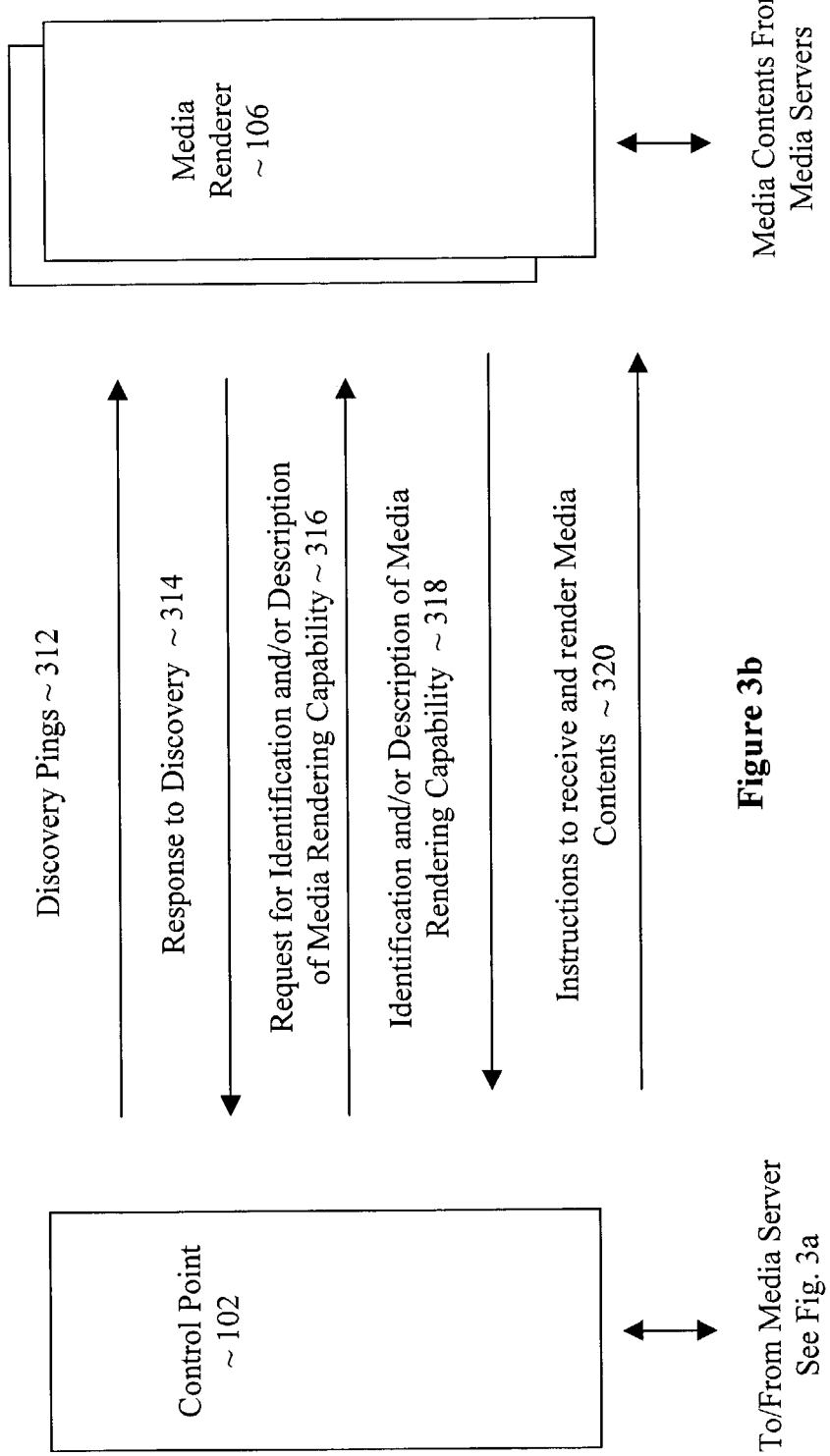

FIGS. 3a-3b illustrate overviews of the communication protocols employed by control point 102 to interact with and control UPnP media servers 104 and UPnP renderers 106, in accordance with one embodiment. As illustrated in FIG. 3a, control point device 102 first discovers the presence of various UPnP media servers 104 in an operating environment or more specifically, a network domain, by issuing discovery requests in accordance with the earlier mentioned UPnP A/V Architecture Specification, op 302.

In response, UPnP media servers 104 respond as called for by the earlier mentioned UPnP A/V Architecture Specification, op 304.

In response to the receipt of each of these responses, control point device 102 requests for the identifications of media contents 132 available from the responding UPnP media server 104, in accordance with the earlier mentioned UPnP A/V Architecture Specification, op 306. For the embodiment, control point device 102 also requests for the corresponding meta data describing the available media contents 132.

In response, the UPnP media server 104 provides the identifications of media contents 132 available, including if applicable, the meta data describing the available media contents 132, op 308.

As alluded to earlier, and to be more fully described below, on receipt of the identifications and meta data, control point device 102 advantageously makes visible these information through the familiar user interface of the file system of control point device 102.

Examples of meta data may include, but are not limited to, the title, the size, the version, date of creation, the media type, the artist, and so forth of the media content 132.

In various embodiments, operations 306 and 308 may be performed via one or more sets of requests and responses.

Thereafter, during operation, at an appropriate time, in response to a user selection to render a media content, control point device 102 instructs the applicable UPnP media servers 104 accordingly, to provide applicable ones of media contents 132 to the appropriate ones of UPnP media renderers 106, op 310. In alternate embodiments, control point device 102 may instruct a UPnP media renderer to pull the applicable media content from the applicable UPnP media server 104 instead.

As illustrated in FIG. 3b, control point device 102 first discovers the presence of various UPnP media renderers 106 in an operating environment or more specifically, a network domain, by issuing discovery pings in accordance with the earlier mentioned UPnP A/V Architecture Specification, op 312.

In response, UPnP media renderers 106 respond as called for by the earlier mentioned UPnP A/V Architecture Specification, op 314.

For the embodiment, in response to the receipt of each of these responses, control point device 102 requests for the description documents describing the responding UPnP media renderer 106, op 316.

In response, the UPnP media renderers 106 provide the description documents as requested, op 318.

As alluded to earlier and to be more fully described below, on receipt of the identifications and description documents, control point device 102 advantageously makes visible these information through the familiar user interface of the file system of control point device 102.

Examples of description information in a description document may include, but are not limited to, the renderer type, e.g. DVD player, media types supported, e.g. DVD, CD, VCD, the manufacturer, and so forth of a UPnP media renderer 106.

In various embodiments, operations 316 and 318 may be performed via one or more sets of requests and responses.

Thereafter, during operation, at an appropriate time, in response to a user selection to render a media content, control point device 102 instructs the applicable UPnP media renderers 106 accordingly, to receive/pull and render provided media contents 132 from UPnP media servers 104, op 320.

Figure 4A:
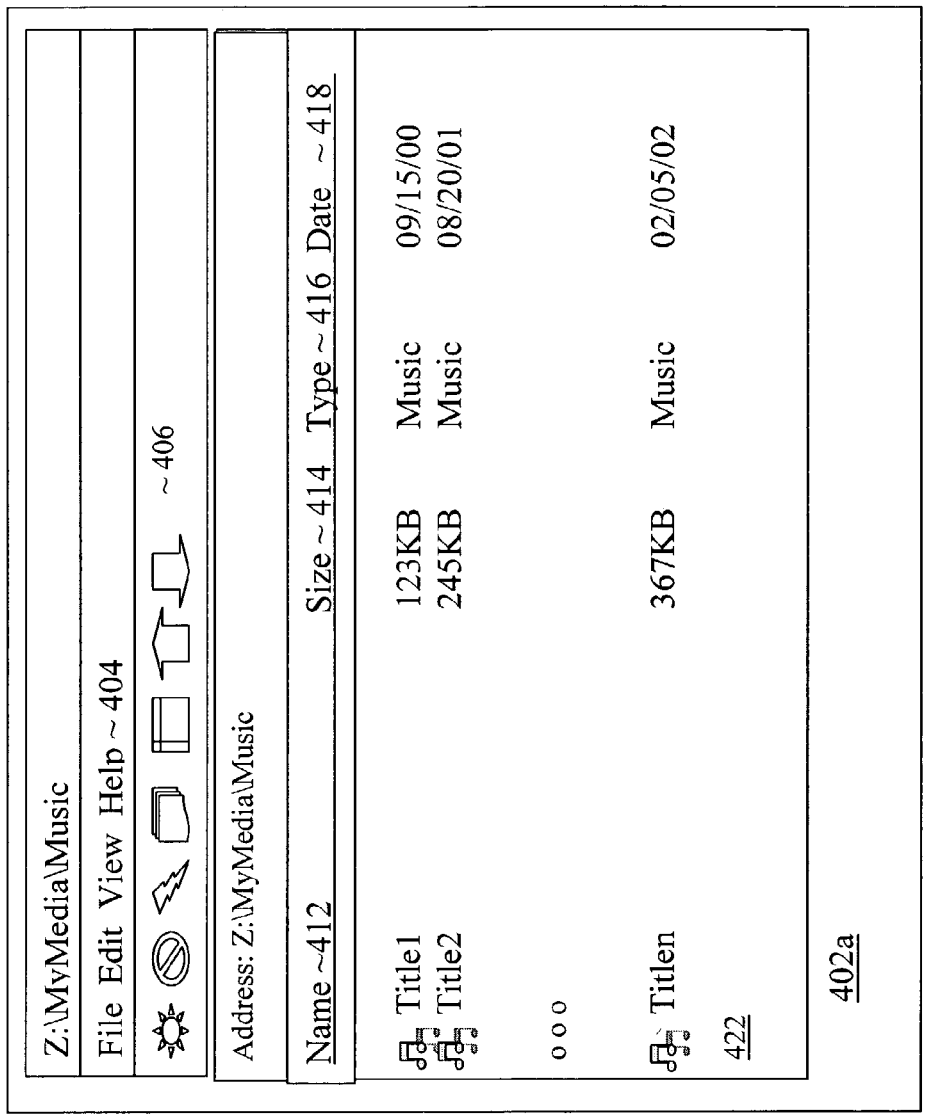
FIGS. 4a-4c illustrate three example screen shots of a file system user interface being advantageously employed to make visible available media contents from UPnP media servers of the operating environment, in accordance with one embodiment.
Figure 4B:
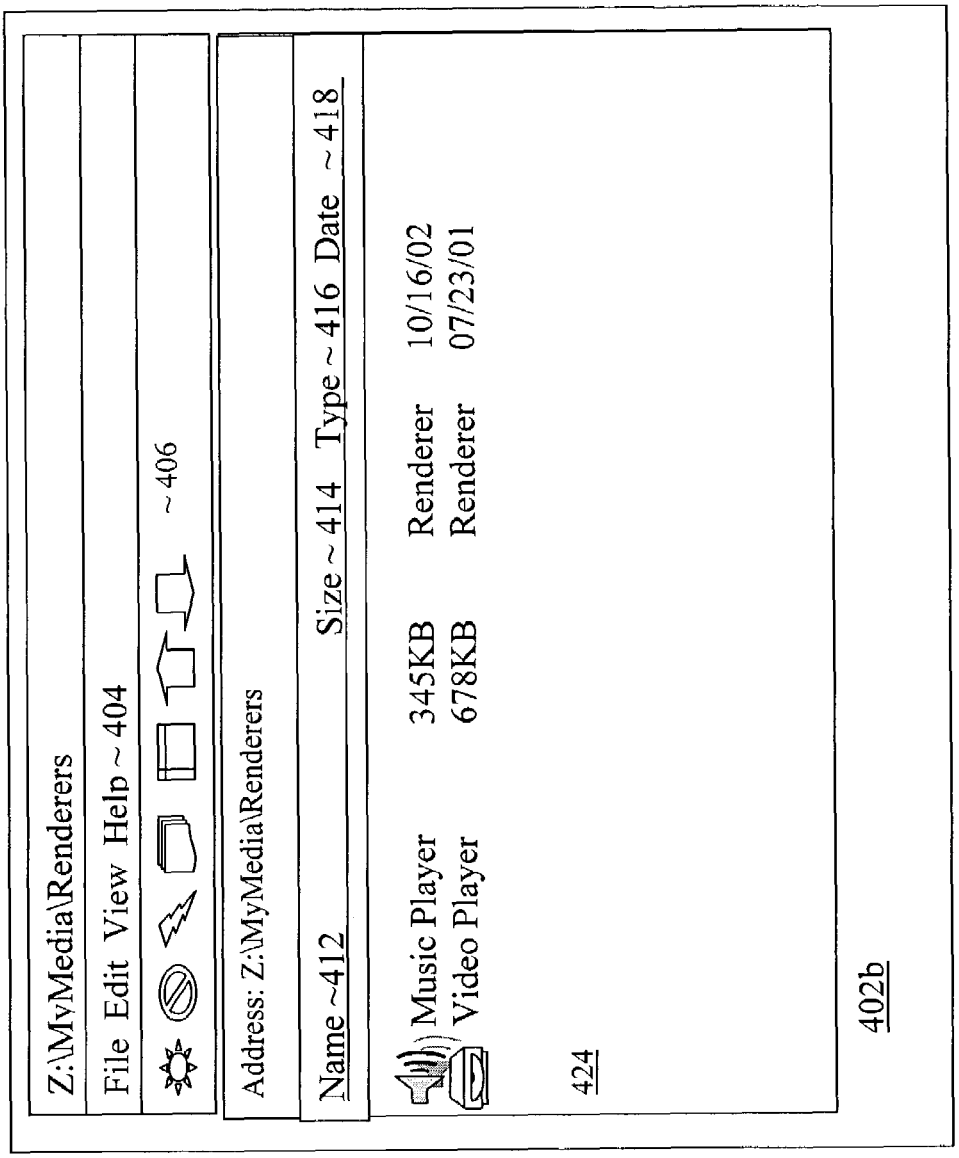
Figure 4C:
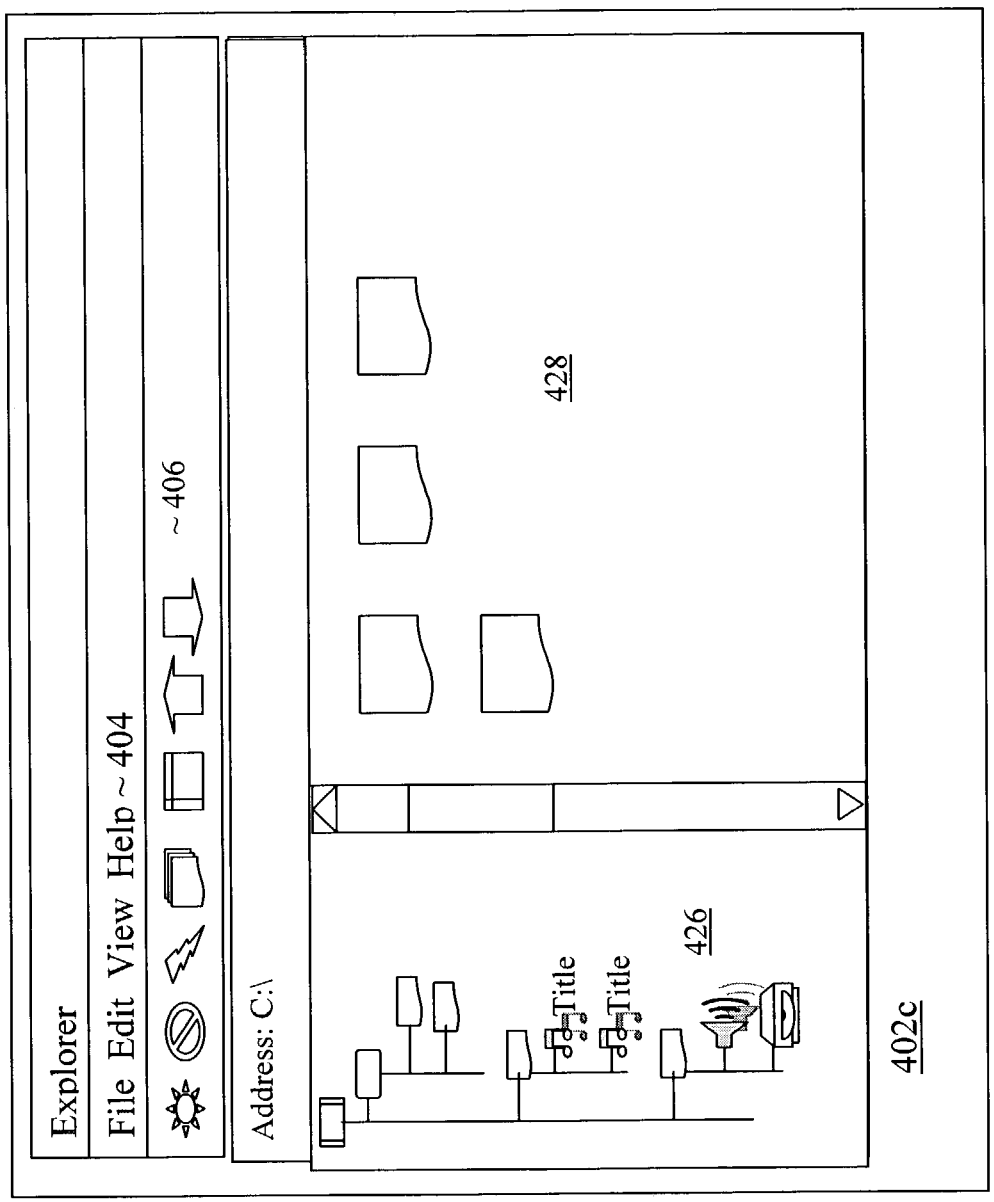

FIGS. 4a-4c illustrate three example screen shots of an user interface of a file system, through which media contents 132 (available from UPnP media servers 104) and UPnP media renderers 106, may be made visible to a user of control point device 102, in accordance with one embodiment.

As illustrated in FIG. 4a, for the embodiment, for each media content 132 available from a UPnP media server 104, media related services 112 in cooperation with file system services 124 cause a corresponding file system entry 422 to be created within the file system. Resultantly, corresponding file system entries 422 may be visible through a file system window, such as file system window 402a.

In various embodiments, file system entries 422 are representative dummy or pseudo media files; in other words, they correspond to media contents 132, but they are not media contents 132 themselves. In various embodiments, file system entries 422 are corresponding pointers or links of media contents 132, i.e. file system entries 422 integrally include location information of media contents 132.

In various embodiments, file system entries 422 may be typed also. That is, file system entries may be typed in accordance with the media type of the corresponding media contents 132, e.g. music, video, and so forth.

Further, in various embodiments, creation of file system entries 422 includes storage of meta data describing the corresponding media contents 132. In particular, in various embodiments, the meta data are stored as properties associated with file system entries 422.

As illustrated in FIG. 4b, for the embodiment, for each media renderer 106 discovered, media related services 112 in cooperation with file system services 124 cause a corresponding file system entry 424 to be created within the file system. Resultantly, corresponding file system entries 424 may be visible through a file system window, such as file system window 402b.

In various embodiments, file system entries 424 are representative dummy or pseudo file system folders. In various embodiments, file system entries 424 are corresponding pointers or links of UPnP media renderers 106, i.e. file system entries 424 integrally include location information of UPnP media renderers 106.

In various embodiments, file system entries 424 may be typed also. That is, file system entries may be typed in accordance with the media type of the media contents 132 UPnP media renderers 106 are equipped to render.

Further, file system entries 424 may also be associated with the description documents of UPnP media renderers 106, describing them.

Refer now to FIG. 4c, for the embodiment, the user interface of the file system also supports viewing of its entries in a tree like structure 426. Accordingly, by advantageously making visible media contents 132 (available from UPnP media servers 104) and UPnP media renderers 106 through an user interface of a file system as earlier described, available media contents 132 and UPnP media renderers 106 may also be visible in the tree like structure 426 as illustrated, while a user is viewing or working with other non-media content related entries 428 of the file system.

Figure 5A:
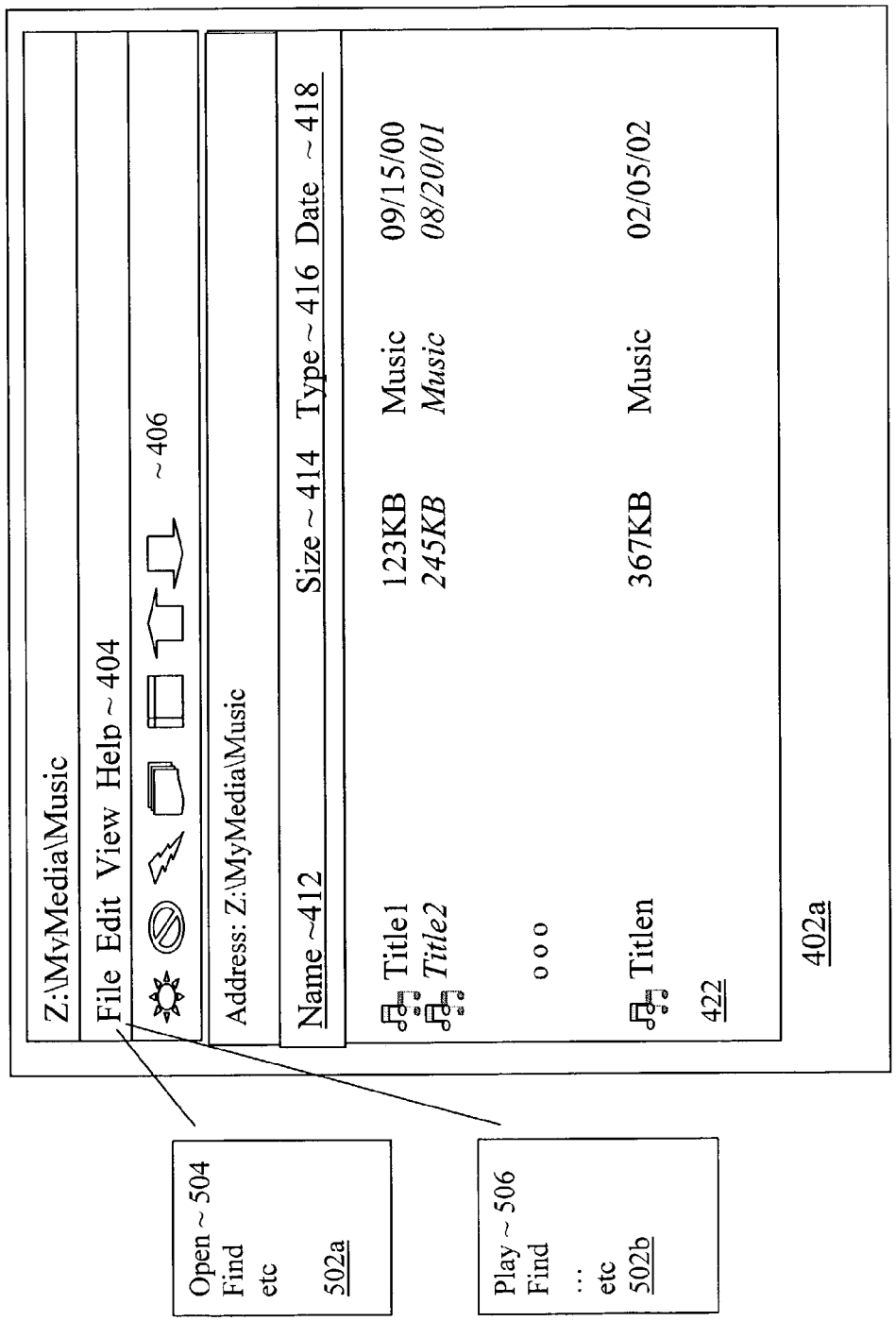
FIGS. 5a-5b illustrate two example screen shots of a file system user interface being advantageously employed to make visible available UPnP media renderers of the operating environment, in accordance with two embodiments.
Figure 5B:
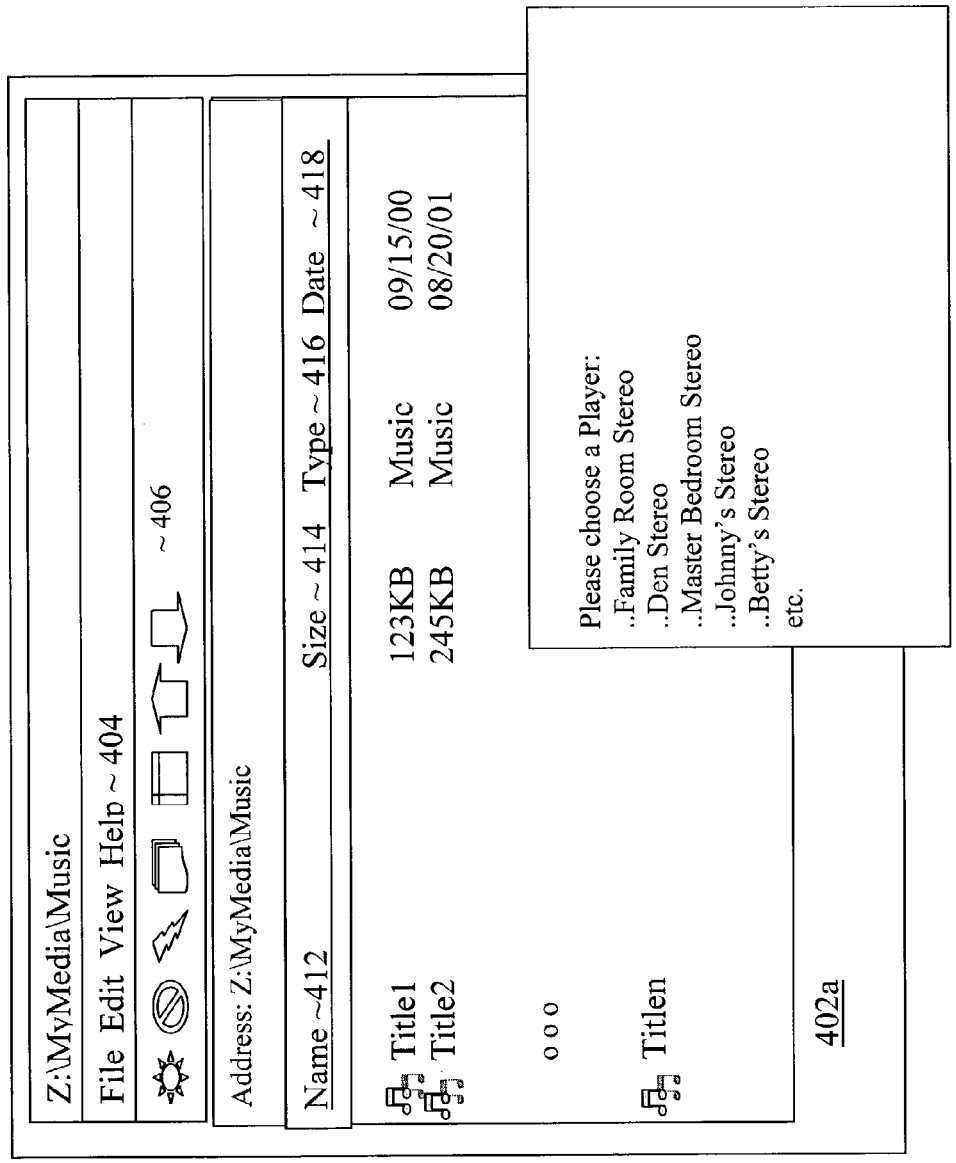

FIGS. 5a-5b illustrate two example screen shots of an user interface of a file system, through which rendering of media contents 132 available from UPnP media servers 104 by selected ones of UPnP media renderers 106 may be initiated by a user of control point device 102, in accordance with couple of embodiments. In these embodiments, rendering of media contents 132 may be initiated through a command available through the drop down menu of 502a/502b of the "File" command.

In alternate embodiments, rendering of media contents 132 may be initiated via other techniques, e.g. through a context menu provided in response to a right click of a cursor control device.

More specifically, as illustrated in FIG. 5a, in the 502a embodiment, rendering of media contents 132 is initiated through the generic "open" command. As will be described in more detail below, in response to the selection of the "open" command, file system services 124 and media related services 112 cooperate to determine whether the selected file system entry 422 against which the "open" command is to "operate" is a corresponding file system entry of a media content 132. If so, file system services 124 and media related services 112 further cooperate to determine its UPnP media server 104, media type, and locate an appropriate available UPnP media renderer 106.

Upon so determining, file system services 124 and media related services 112 cooperate to cause the corresponding media content 132 to be opened (also referred to as "launched"), and be provided from the appropriate UPnP media server 104 to the appropriate UPnP media renderer 106 to render.

In alternate embodiments, file system services 124 and media related services 112 may cooperate to cause the corresponding media content 132 to be rendered by other applications, such as a media player application, instead.

The 502b embodiment is similar to the 502a embodiment, except a media content tailored "open", or more specifically, a "play" command is employed (instead of the generic "open" command). File system services 124 are enhanced to determine the entry type of the selected file system entry when the drop down menu is requested. If the entry type of the selected file system entry is determined to be a file system entry corresponding to a media content 132, drop down menu 502b with the tailored "play" command is presented to the user instead.

On selection of the "play" command, file system services 124 and media related services 112 cooperate to respond in substantially the same manner as earlier described.

In various implementations, regardless of embodiment 502a or embodiment 502b, upon initiating the rendering of the selected media content 132, media related services 112 may further facilitate a user in selecting a UPnP media renderer 106 of the user's choice, if multiple capable UPnP media renderers 106 are available.

Figure 6A:
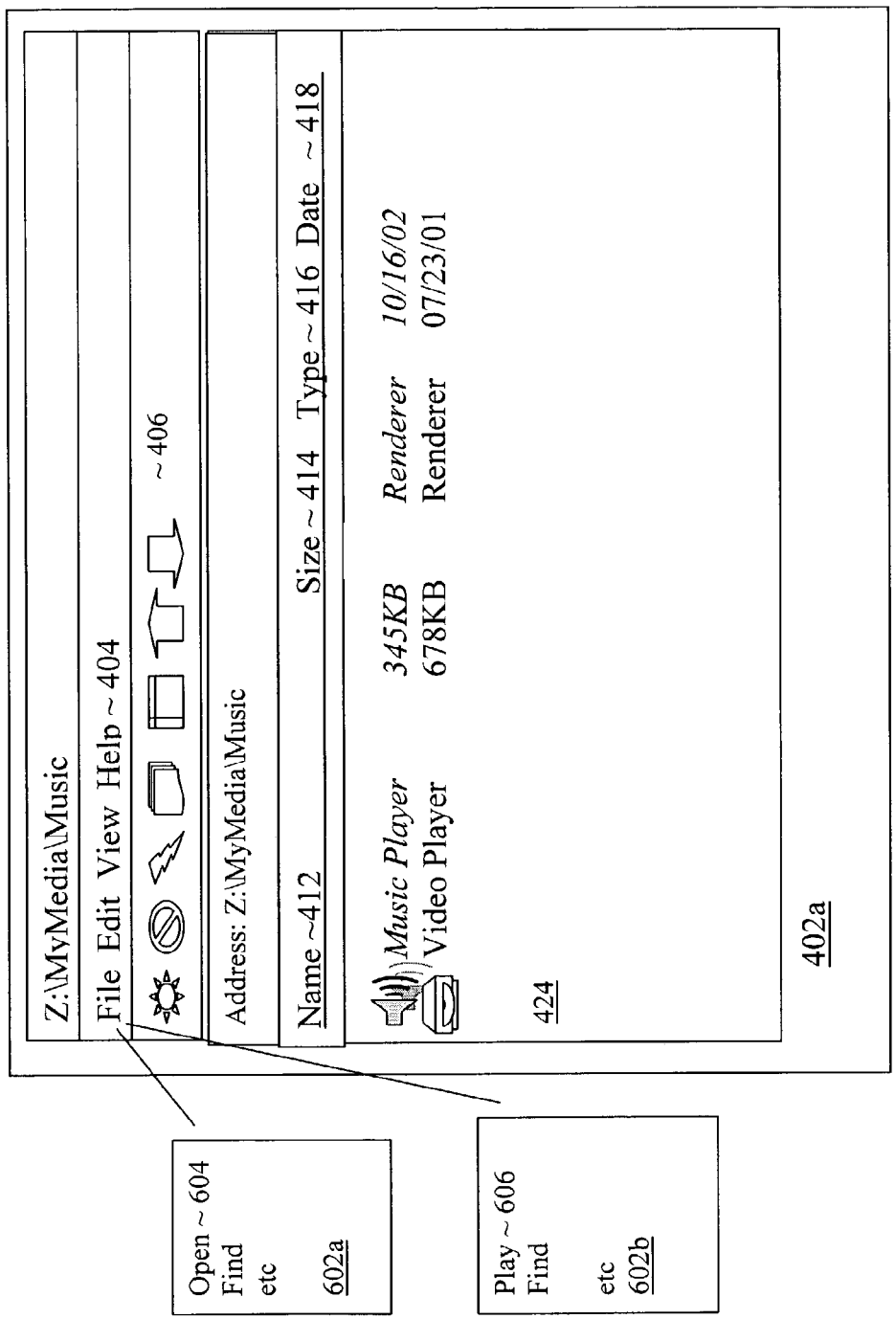
FIGS. 6a-6b illustrate two example screen shots of a file system user interface being advantageously employed to facilitate a user in employing a UPnP media renderer to render media content available from a UPnP media server of the operating environment, in accordance with two other embodiments.
Figure 6B:
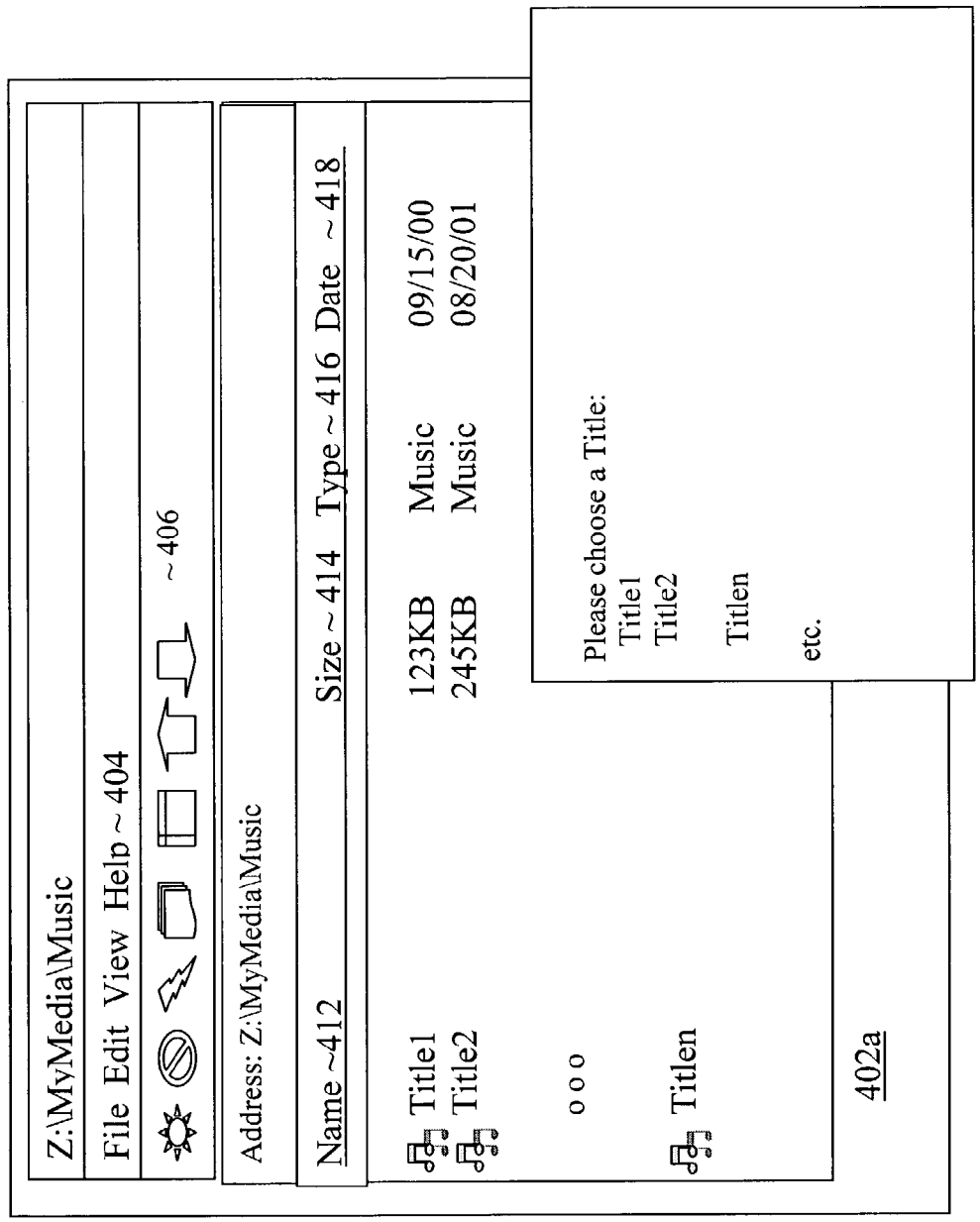

FIGS. 6a-6b illustrate two example screen shots of an (augmented) user interface of a file system, through which rendering of media contents 132 available from UPnP media servers 104 by selected ones of UPnP media renderers 106 may be initiated by a user of control point device 102, in accordance with two other embodiments.

Similar to the embodiments of FIGS. 5a-5b, a media content 132 of interest may be initiated using a generic "Open" or a tailored "Play" command within drop down menu 602a/602b of the "File" command, as illustrated in FIG. 6a. The difference being, for the embodiments of FIGS. 6a-6b, the "Open" or "Play" command is applied to a corresponding file system entry of a media renderer 106 instead (as opposed to a corresponding file system entry of a media content 132 as in the case FIGS. 5a-5b).

For the 602b embodiment of FIG. 6a, the tailored "Play" command may be provided by analyzing the nature of the selected file system entry, when the "File" drop down menu is requested. More specifically, the tailored "Play" command may be provided on determining that the selected file system entry is a UPnP media renderer 106, when the "File" drop down menu is requested.

As illustrated in FIG. 6b, upon initiating the rendering of media content 132 by "launching" a UPnP media renderer 106, file system services 124 and media related services 112 may further cooperate to facilitate a user in selecting the media content 132 to be rendered by the selected UPnP media renderer 106.

In various embodiments, the media contents 132 presented for selection are media contents 132 with the media type(s) supported by the selected UPnP media renderer 106 only.

Figure 7:
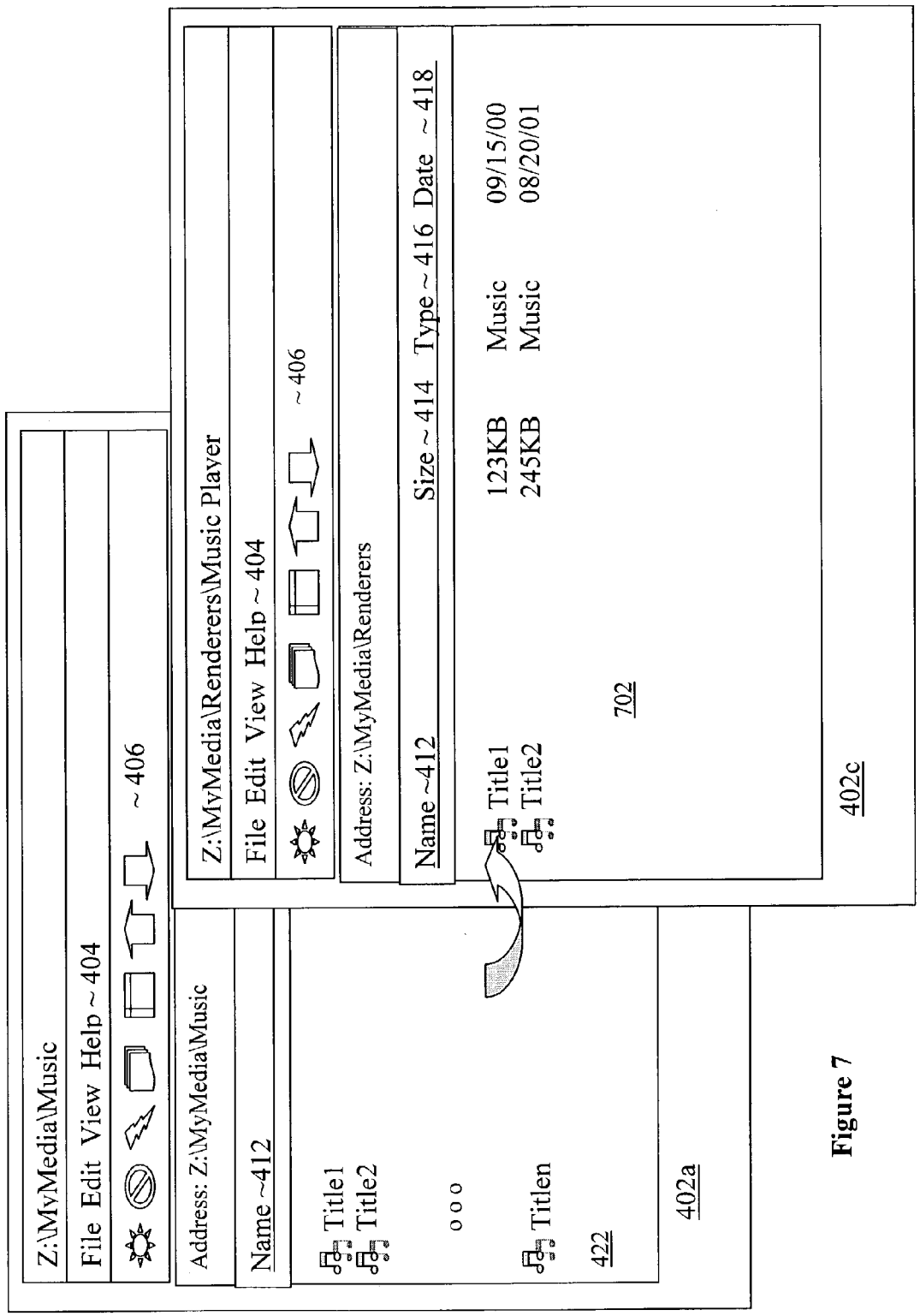
FIG. 7 illustrates an example screen shot of a file system user interface being advantageously employed to facilitate a user in employing a UPnP media renderer to render media content available from a UPnP media server of the operating environment, in accordance with yet another embodiment.

FIG. 7 illustrates an example screen shot of an user interface of a file system, through which rendering of media contents 132 available from UPnP media servers 104 by selected ones of UPnP media renderers 106 may be initiated by a user of control point device 102, in accordance with yet another embodiment. In this embodiment, rendering of a media content 132 may be initiated by dragging and dropping the corresponding file system entry of a media content 132 of interest from file system window 402a, into a folder window 402c of the corresponding UPnP media renderer 106.

In various embodiments, the corresponding file system entry of a media content 132 of interest is queued, if it is dropped into a folder window 402c of a corresponding UPnP media renderer 106 when the UPnP media renderer 106 is in use. In other embodiments, the corresponding file system entry of a media content 132 of interest may be dropped into a folder window 402c of the corresponding UPnP media renderer 106 only if the UPnP media renderer 106 is not currently in use.

Figure 8:
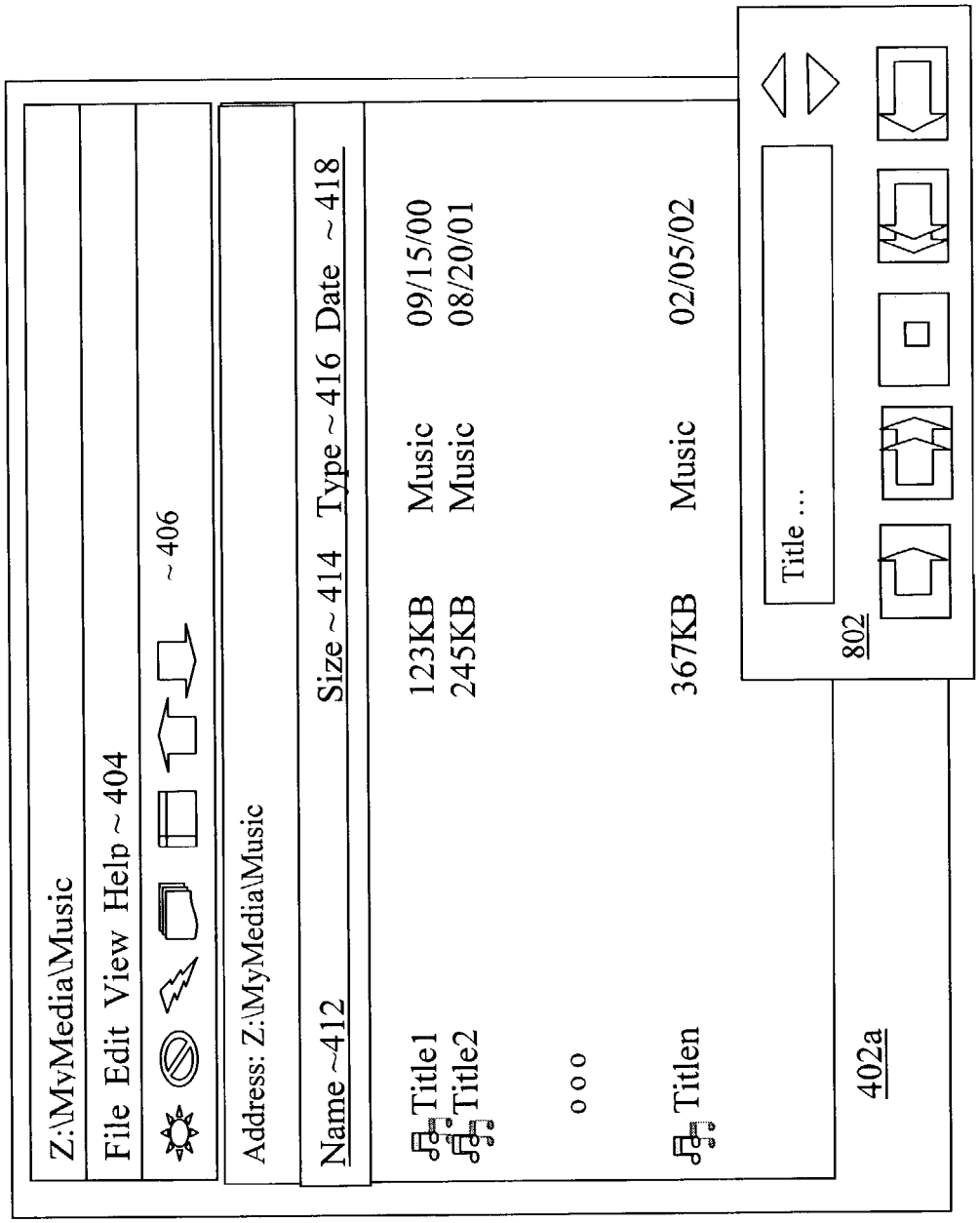
FIG. 8 illustrates an example screen shot of a file system user interface being advantageously employed to facilitate a user in controlling a UPnP media renderer's rendering of a media content available from a UPnP media server of the operating environment, in accordance with one embodiment.

FIG. 8 illustrates an example screen shot of an augmented user interface of a file system, through which rendering of media contents 132 available from UPnP media servers 104 by selected ones of UPnP media renderers 106 may be controlled by a user of control point device 102, in accordance with yet another embodiment. As illustrated, regardless of the method the rendering of a media content 132 of interest is initiated, media related services 112 may further facilitate a user in controlling the rendering. For examples, pausing, stopping, restarting, increasing volume, decreasing volume, and so forth, may be supported through a pop up control panel like interface 802.

Figure 9:
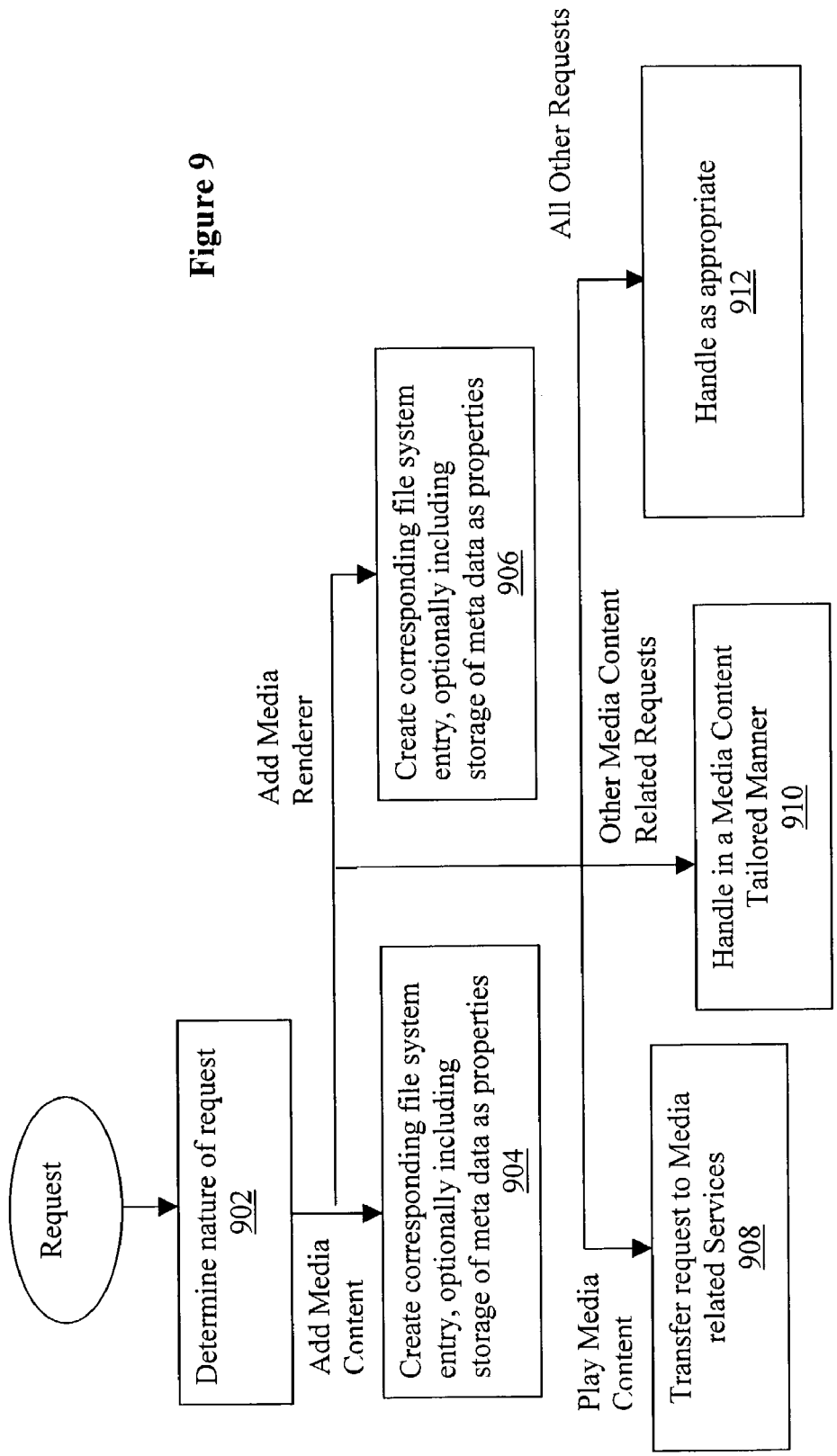
FIG. 9 illustrates the operational flow of the relevant aspects of the file system services of the control point device of FIG. 1, in accordance with one embodiment.

FIG. 9 illustrates the operational flow of the relevant aspects of file system services 124, in accordance with one embodiment. As illustrated, on receipt of a request, which may be a user command such as selection of the "open" command of the "File" drop down menu, or a call from e.g. one of the media related services 112, file system services 124 determine the nature of the request, block 902.

If the request is determined to be a request to add a corresponding file system entry to the file system for a media content 132 (e.g. by media content management service 114), file system services 124 create the corresponding file system entry accordingly, block 904.

As described earlier, in various embodiments, the corresponding entry may be a representative pseudo media file, or a pointer/link integrally including the location of the corresponding media content. In various embodiments, the creation may also include storage of meta data describing the corresponding media content 132 as properties associated with the corresponding file system entry.

On the other hand, if the request is determined to be a request to add a corresponding file system entry to the file system for a UPnP media renderer 106 (e.g. by rendering control service 116), file system services 124 create the corresponding file system entry accordingly, block 906.

As described earlier, in various embodiments, the corresponding file system entry may be a representative pseudo file folder. Further, the creation may also include storage of the description documents describing the corresponding media renderer 106 as properties associated with the corresponding file system entry.

If the request is determined to be a request to open/play a media content 132 (e.g. by a user selection of the "open"/"play" command of the "File" drop down menu) or open/play media content 132 on a media renderer 106, file system services 124 cause the corresponding media content 132 or rendering of media content 132 on a media renderer 106 to be "launched" (i.e. open or play) accordingly, block 908. In various embodiments, file system services 124 effectuate "launching" of media content 132 or a media renderer 106 through media related services 112 (see description below).

If the request is determined to be another media content/renderer related request, e.g. to display the "properties" of the corresponding entry (e.g. by a user selection of a "property" command), file system services 124 cause the media content/renderer related request to be serviced accordingly, block 910. Similarly, in various embodiments, where appropriate, file system services 124 handle the requests with the assistance of media related services 112 (see description below).

For example, in the case of the example request to display the "properties" of the corresponding file system entry of a media content 132 or a UPnP media renderer 106, file system services 124 cause the meta data of the corresponding media content 132 or UPnP media renderer 106 to be "displayed" accordingly. The display may be effectuated in like manner as display of properties of conventional file system entries are effectuated.

Finally, if the request is determined to be other non media content/renderer related request, e.g. to refresh the content of a user interface window of the file system (e.g. by a user selection of a "refresh" command of a "View" drop down menu), file system services 124 cause the non media content/renderer related request to be serviced accordingly, block 912.

FIG. 10 illustrates the operational flow of the relevant aspects of media related services 112, in accordance with one embodiment. As illustrated, similar to file system services 124, on receipt of a request, which may be e.g. a call from file system services 124, media related services 112 determine the nature of the request, block 1002.

On determining that the request is to discover media content 132 available from media servers 104 in a network domain (e.g. a call from an initialization routine during start-up or reset), media related services 112 determine (i.e. discover) the presence, if any, of UPnP media servers 104 in the network domain, and media contents 132 available from the UPnP media servers 104, block 1004.

For the embodiment, the determination is performed by media content management services 114. Further, the determination includes determining (i.e. discovering) the meta data describing media contents 132 available from the identified UPnP media servers 104. Moreover, the determinations are performed in accordance with the protocols and services specified in the earlier mentioned UPnP Specification.

If the request is determined to be a request to discover UPnP media renderers 106 in a network domain (e.g. a call from an initialization routine during start-up or reset), media related services 112 determine (i.e. discover) the presence, if any, of UPnP media renderers 106 in the network domain, block 1006.

For the embodiment, the determination is also performed by rendering control service 116. Further, the determination includes determining (i.e. discovering) the description documents describing discovered UPnP media renderers 106. Similarly, the determinations are performed in accordance with the protocols and services specified in the earlier mentioned UPnP Specification.

If the request is determined to be a request to play media content 132 (e.g. a call from file system services 124 in response to a user interaction with an element of the user interface of the file system), media related services 112 cause the media content 132 to be rendered, block 1008.

For the embodiment, the operation includes determining the media type of the media content 132 to be rendered. Further, the operation includes facilitating a user in selection one of a number of UPnP media renderers 106 equipped to support the media type, if more than one UPnP media renderer 106 is so equipped. In various embodiments, rendering control service 116 may also identify a selected media content 132 as having an unsupported media type, i.e. no available media renderer 106 supports the particular media type. For the embodiment, the determinations are performed in conjunction with file system services 124.

In various embodiments, media related services 112 further facilitate a user in controlling the rendering, e.g. temporarily suspending the rendering, resuming thereafter, increasing or decreasing volume, and so forth, block 1010. Similar to the various earlier described services, controlling of a media renderer 106 is performed in accordance with protocols and services specified in the earlier identified UPnP Specification.

For the embodiment, the operations of block 1008-1010 are performed by rendering control service 116.

CONCLUSION AND EPILOGUE

Thus, it can be seen from the above descriptions, a novel user friendly technique to facilitate making visible media contents available from UPnP media servers and UPnP media renderers, and initiating rendering of the media contents using the UPnP media renderers has been described.

While the present invention has been described in terms of the foregoing embodiments, those skilled in the art will recognize that the invention is not limited to the embodiments described. The present invention can be practiced with modification and alteration within the spirit and scope of the appended claims.

In particular, file system services 124 in cooperation with media related services 112 may also support the deletion of a corresponding entry of a discovered media content, making its availability not visible, using a conventional file system deletion request. File system services 124 in cooperation with media related services 112 may also support the addition of a media content to a media server 104 through the addition of a corresponding entry in the file system, using a conventional file system add entry service. Again, interaction with the media server 104 may be conducted in accordance with the protocols and services specified in the early mentioned UPnP Specification.

In other embodiments, selection of a media renderer for a selected media content may be facilitated through a context menu presented in response to a right click of a cursor control device.

Further, in lieu of enhancing file system services 124, the present invention may be implemented with a file system service "add on", intercepting all interactions with the file system, determining whether the interactions are media content/renderer related, and handling all interactions determined to be media content/renderer related. Interactions that are not media content/renderer related are forwarded to the base (i.e. unenhanced) file system services to handle.

In various embodiments, some of the functions/services described as being offered by enhanced file system services 124, or media related services 112, may be offered by media related services 112 or file system services 124 instead. Further, some of the functions/services described as being offered cooperatively by enhanced file system services 124 and media related services 112, may be offered by either media related services 112 or file system services 124 instead. Likewise, some of the functions/services described as being offered by either enhanced file system services 124 or media related services 112, may be offered cooperatively by media related services 112 and file system services 124 instead.

Thus, the description is to be regarded as illustrative instead of restrictive on the present invention.

What is claimed is:

1. In a networked computing device of a network domain, an automated method of operation comprising:
   discovering a first UPNP media renderer of the network domain, the first UPNP media renderer being equipped to render media content of a first media type;
   in response to said discovery, automatically creating a first corresponding entry in a file system of the networked computing device for the first UPNP media renderer, to first indicate availability of the first UPNP media renderer to a user of the networked computing device through a user interface of the file system of the networked computing device and to second indicate availability of the first UPNP media renderer to render media content of the first media type;
   receiving through the user interface of the file system, a request to use the first UPNP media renderer to render a first media content of the first media type, in a form of a user action dragging an entry of the file system corresponding to the first media content of the first media type and dropping the entry into the first corresponding entry of the first UPNP media renderer;
   in response, causing the first media content to be made available to, and rendered by the first UPNP media renderer;
   discovering a second UPNP media renderer of the network domain, the second UPNP media renderer equipped to render media content of a second media type; and
   in response to said discovery of the second UPNP media renderer, automatically creating a second corresponding entry in the file system of the networked computing device for the second UPNP media renderer, to third indicate availability of the second UPNP media renderer to the user of the networked computing device, in conjunction with said availability of the first UPNP media renderer to the user, through the user interface of the file system of the networked computing device.

2. The method of claim 1, wherein said automatic creating of a first corresponding entry in a file system comprises creating a first corresponding file folder in the file system.

3. The method of claim 2, wherein said automatic creating of a first corresponding entry in a file system further comprises storing a description document of the first UPNP media renderer as properties of the first corresponding file folder, the description document describing the first UPNP media renderer.

4. The method of claim 1, wherein the method further comprises
   receiving through the user interface of the file system, a second request to display description document describing the first UPNP media renderer in a second form of a file system request to display descriptive information of the first corresponding entry of the first UPNP media renderer; and
   in response, displaying the requested description document describing the first UPNP media renderer.

5. A computing device comprising:
   at least one processor; and
   logic to be operated by the at least one processor to
   discover a first UPNP media renderer of a network domain including the computing device, the first UPNP media renderer being equipped to render media content of a first media type;
   in response to said discovery, automatically create a first corresponding entry in a file system of the computing device for the first UPNP media renderer, to first indicate availability of the first UPNP media renderer to a user of the computing device through a user interface of the file system of the computing device and to second indicate availability of the first UPNP media renderer to render media content of the first media type;
   receive through the user interface of the file system, a request to use the first UPNP media renderer to render a first media content of the first media type, in a form of a user action dragging an entry of the file system corresponding to the first media content of the first media type and dropping the entry into the first corresponding entry of the first UPNP media renderer;
   in response, cause the first media content to be made available to, and rendered by the first UPNP media renderer;
   discover a second UPNP media renderer of the network domain, the second UPNP media renderer equipped to render media content of a second media type; and
   in response to said discovery of the second UPNP media renderer, automatically create a second corresponding entry in the file system of the computing device for the second UPNP media renderer, to third indicate availability of the second UPNP media renderer to the user of the computing device, in conjunction with said availability of the first UPNP media renderer to the user, through the user interface of the file system of the computing device.

6. The computing device of claim 5, wherein the logic is further to said automatically cause and said automatically cause includes causing a corresponding file folder to be created in the file system for the UPNP media renderer.

7. The computing device of claim 5, wherein the logic is further to include with said automatic creating of a corresponding entry in the file system for the UPNP media renderer, storing of description document of the UPNP media renderer as properties of the corresponding file system entry, the description document describing the UPNP media renderer.

8. The computing device of claim 5, wherein the logic is further to facilitate and service generic requests to display properties of entries of the file system, as well as UPNP media renderer tailored requests to display description document of the UPNP media renderer.

9. The computing device of claim 5, wherein the logic is further to discover presence of the UPNP media renderer.

10. The computing device of claim 5, wherein said computing device is a selected one of a desktop computer, a laptop computer, a tablet computer, a palm sized computing device, a pocket personal computer, and a personal digital assistant.

11. An article of manufacture comprising:
   a recordable medium; and
   a plurality of programming instructions recorded thereon, the programming instructions are designed to implement for a computing device
   discover a first UPNP media renderer of a network domain including the computing device, the first UPNP media renderer being equipped to render media content of a first media type;
   in response to said discovery, automatically create a first corresponding entry in a file system of the computing device for the first UPNP media renderer, to first indicate availability of the first UPNP media renderer to a user of the computing device through a user interface of the file system of the computing device and to second indicate availability of the first UPNP media renderer to render media content of the first media type;
   receive through the user interface of the file system, a request to use the first UPNP media renderer to render a first media content of the first media type, in a form of a user action dragging an entry of the file system corresponding to the first media content of the first media type and dropping the entry into the first corresponding entry of the first UPNP media renderer;
   in response to said receive, cause the first media content to be made available to, and rendered by the first UPNP media renderer, discover a second UPNP media renderer of the network domain, the second UPNP media renderer equipped to render media content of a second media type; and
   in response to said discovery of the second UPNP media renderer, automatically create a second corresponding entry in the file system of the computing device for the second UPNP media renderer, to third indicate availability of the second UPNP media renderer to the user of the computing device, in conjunction with said availability of the first UPNP media renderer to the user, through the user interface of the file system of the computing device.

* * * * *